(12) United States Patent
Rugge

(10) Patent No.: US 7,240,028 B1
(45) Date of Patent: Jul. 3, 2007

(54) AUTOMATED FINANCIAL REGISTER RECONCILIATION IN A COMBINED USER INTERFACE

(75) Inventor: Robert D. Rugge, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 860 days.

(21) Appl. No.: 10/097,602

(22) Filed: Mar. 15, 2002

(51) Int. Cl.
*G06F 17/60* (2006.01)

(52) U.S. Cl. .......................................... 705/30; 707/10
(58) Field of Classification Search ................. 705/30; 707/10; 717/100
See application file for complete search history.

(56) References Cited

U.S. PATENT DOCUMENTS

| | | | | |
|---|---|---|---|---|
| 5,134,564 A | * | 7/1992 | Dunn et al. .................... | 705/33 |
| 5,383,113 A | * | 1/1995 | Kight et al. ................... | 705/40 |
| 5,390,113 A | * | 2/1995 | Sampson ....................... | 705/30 |
| 5,433,483 A | * | 7/1995 | Yu ................................. | 283/58 |
| 5,832,460 A | | 11/1998 | Bednar et al. | |
| 5,873,072 A | * | 2/1999 | Kight et al. ................... | 705/40 |
| 5,884,288 A | * | 3/1999 | Chang et al. .................. | 705/40 |
| 5,903,881 A | * | 5/1999 | Schrader et al. .............. | 705/42 |
| 5,918,216 A | * | 6/1999 | Miksovsky et al. ........... | 705/35 |
| 6,006,204 A | | 12/1999 | Malcolm | |
| 6,018,722 A | * | 1/2000 | Ray et al. .................. | 705/36 R |
| 6,041,312 A | | 3/2000 | Bickerton et al. | |
| 6,058,375 A | * | 5/2000 | Park ............................. | 705/30 |
| 6,606,606 B2 | * | 8/2003 | Starr ......................... | 705/36 R |
| 6,839,687 B1 | * | 1/2005 | Dent et al. .................... | 705/40 |
| 6,882,983 B2 | * | 4/2005 | Furphy et al. ................ | 705/30 |
| 6,904,411 B2 | * | 6/2005 | Hinkle .......................... | 705/35 |
| 7,007,003 B1 | * | 2/2006 | Rybicki ......................... | 707/1 |
| 7,050,996 B1 | * | 5/2006 | Blagg et al. ................... | 705/30 |

OTHER PUBLICATIONS

"Peachtree: Using General Ledger," 1989 Peachtree Software, First Edition.*
C. Morgan, "Time is Money," Apple Orchard, Vol. 5, N. 6, p. 21, Jul. 1984.
P. Scisco, "Easy Money: Personal Finance Software," PC World, vol. 13, N. 1, pp. 165-170, Jan. 1995.
B. Howard, "PC Banking Benefits," PC Magazine, vol. 15. N. 18, p. 95, Oct. 22, 1996.
Volker Gaede, et al., "Multidimensional Access Methods," ACM Computing Surveys, 30(2), 1998; pp. 1-66.
Miao Ianfang, "Fuzzy Character String Matching Algorithm and Its Applications," Mini-Micro Systems, Vol. 17, No. 10, pp. 72-76 (Oct. 1996) (English Abstract).
Du Jian-feng, et al., "Implementation and Application of Fuzzy Case-Based Reasoninig," J. of Beijing University of Posts and telecommunications, vol. 24, No. 1, pp. 96-98 (Mar. 2001) (English Abstract).

* cited by examiner

*Primary Examiner*—Andrew Joseph Rudy
(74) *Attorney, Agent, or Firm*—Banner & Witcoff, Ltd.

(57) ABSTRACT

Unreconciled information regarding financial account transactions is received from multiple sources. Transactions identified in the information received from one of the sources are classified according to the probability of matching a transaction identified in information received from another source. Transactions identified in both sources are displayed in a common user interface, together with account balances adjusted for those transactions. The user is able to accept the classification, and as to at least some classes of transactions, change the classification or the matching transaction. The unaccepted transactions may be rendered so as to indicate their unaccepted state.

21 Claims, 13 Drawing Sheets

| Num | Date | Payee | C | Payment | Deposit | Balance |
|---|---|---|---|---|---|---|
| 1999 | 09/22/2001 | Health Club | C | 100.00 | | 893.49 |
| 2000 | 09/25/2001 | Pizza Dude | C | 23.00 | | 870.49 |
| | 09/30/2001 | paycheck | C | | 800.00 | 1670.49 |
| 2001 | 10/07/2001 | City Power and Light | | 52.00 | | 1722.49 |
| 2002 | 10/09/2001 | Acme Insurance | | 85.00 | | 1637.49 |
| ATM | 10/13/2001 | | | 40.00 | | 1597.49 |
| | 10/15/2001 | paycheck | | | 850.55 | 2448.04 |
| 2003 | 10/19/2001 | Capital City Finance | | 400.00 | | 2048.04 |
| 2005 | 10/20/2001 | Friendly Mortage | | 542.12 | | 1505.92 |

FIG. 4

| Num | Date | Payee | C | Payment | Deposit | Balance |
|---|---|---|---|---|---|---|
| 1999 | 09/22/2001 | Health Club | C | 100.00 | | 893.49 |
| 2000 | 09/25/2001 | Pizza Dude | C | 23.00 | | 870.49 |
| | 09/30/2001 | paycheck | C | | 800.00 | 1670.49 |
| ! 2001 | 10/07/2001 | City Power and Light | E | 52.00 | | 1722.49 |
| 2002 | 10/09/2001 | Acme Insurance | | 85.00 | | 1637.49 |
| ATM | 10/13/2001 | | | 40.00 | | 1597.49 |
| | 10/14/2001 | ATM withdrawal | E | 100.00 | | 1497.49 |
| | 10/15/2001 | paycheck | E | | 850.55 | 2348.04 |
| 2003 | 10/19/2001 | Capital City Finance | | 400.00 | | 1948.04 |
| 2004 | 10/19/2001 | Friendly Mortgage Co. | E | 524.12 | | 1423.92 |
| 2005 | 10/20/2001 | Friendly Mortage | | 542.12 | | 881.80 |

FIG. 5

| Num | Date | Payee | C | Payment | Deposit | Balance |
|---|---|---|---|---|---|---|
| 1999 | 09/22/2001 | Health Club | C | 100.00 | | 893.49 |
| 2000 | 09/25/2001 | Pizza Dude | C | 23.00 | | 870.49 |
| | 09/30/2001 | paycheck | C | | 800.00 | 1670.49 |
| ! 2001 | 10/08/2001 | City Power and Light | E | 52.00 | | 1722.49 |
| | colspan="6" | A downloaded transaction has been merged with a manually entered transaction: Your entry: 10/07/2001 City Power and Light $52.00 Bank's entry: 10/08/2001 CityPowe1344A $52.00  [ACCEPT] [MORE...] |
| 2002 | 10/09/2001 | Acme Insurance | | 85.00 | | 1637.49 |
| ATM | 10/13/2001 | | | 40.00 | | 1597.49 |
| | 10/14/2001 | ATM withdrawal | E | 100.00 | | 1497.49 |
| | 10/15/2001 | paycheck | E | | 850.55 | 2348.04 |

FIG. 6

| Num | Date | Payee | C | Payment | Deposit | Balance |
|---|---|---|---|---|---|---|
| 1999 | 09/22/2001 | Health Club | C | 100.00 | | 893.49 |
| 2000 | 09/25/2001 | Pizza Dude | C | 23.00 | | 870.49 |
| | 09/30/2001 | paycheck | C | | 800.00 | 1670.49 |
| 2001 | 10/07/2001 | City Power and Light | E | 52.00 | | 1722.49 |
| 2002 | 10/09/2001 | Acme Insurance | | 85.00 | | 1637.49 |
| ATM | 10/13/2001 | | | 40.00 | | 1597.49 |
| | 10/14/2001 | ATM withdrawal | E | 100.00 | | 1497.49 |
| | 10/15/2001 | paycheck | E | | 850.55 | 2348.04 |
| 2003 | 10/19/2001 | Capital City Finance | | 400.00 | | 1948.04 |
| 2004 | 10/19/2001 | Friendly Mortgage Co. | E | 524.12 | | 1423.92 |
| 2005 | 10/20/2001 | Friendly Mortgae | | 542.12 | | 881.80 |

FIG. 7

| Num | Date | Payee | C | Payment | Deposit | Balance |
|---|---|---|---|---|---|---|
| 2001 | 10/07/2001 | City Power and Light | E | 52.00 | | 1722.49 |
| 2002 | 10/09/2001 | Acme Insurance | | 85.00 | | 1637.49 |
| ATM | 10/13/2001 | | | 40.00 | | 1597.49 |
| | 10/14/2001 | ATM withdrawal | E | 100.00 | | 1497.49 |
| | This transaction was downloaded from your bank and does not match any entries you made. Bank details: ATM debit 10/14/01 123 Main Street  $100.00  [ACCEPT] [MORE...] | | | | | |
| | 10/15/2001 | paycheck | E | | 850.55 | 2348.04 |
| 2003 | 10/19/2001 | Capital City Finance | | 400.00 | | 1948.04 |
| 2004 | 10/19/2001 | Friendly Mortgage Co. | E | 524.12 | | 1423.92 |
| 2005 | 10/20/2001 | Friendly Mortgae | | 542.12 | | 881.80 |

FIG. 8

| Num | Date | Payee | C | Payment | Deposit | Balance |
|---|---|---|---|---|---|---|
| 1999 | 09/22/2001 | Health Club | C | 100.00 | | 893.49 |
| 2000 | 09/25/2001 | Pizza Dude | C | 23.00 | | 870.49 |
| | 09/30/2001 | paycheck | C | | 800.00 | 1670.49 |
| 2001 | 10/07/2001 | City Power and Light | E | 52.00 | | 1722.49 |
| 2002 | 10/09/2001 | Acme Insurance | | 85.00 | | 1637.49 |
| ATM | 10/13/2001 | | | 40.00 | | 1597.49 |
| | 10/14/2001 | ATM withdrawal | E | 100.00 | | 1497.49 |
| | 10/15/2001 | paycheck | E | | 850.55 | 2348.04 |
| 2003 | 10/19/2001 | Capital City Finance | | 400.00 | | 1948.04 |
| 2004 | 10/19/2001 | Friendly Mortgage Co. | E | 524.12 | | 1423.92 |
| 2005 | 10/20/2001 | Friendly Mortgae | | 542.12 | | 881.80 |

FIG. 9

| Num | Date | Payee | C | Payment | Deposit | Balance |
|---|---|---|---|---|---|---|
| 2002 | 10/09/2001 | Acme Insurance | | 85.00 | | 1637.49 |
| ATM | 10/13/2001 | | | 40.00 | | 1597.49 |
| | 10/14/2001 | ATM withdrawal | E | 100.00 | | 1497.49 |
| | 10/15/2001 | paycheck | E | | 850.55 | 2348.04 |
| 2003 | 10/19/2001 | Capital City Finance | | 400.00 | | 1948.04 |
| 2004 | 10/19/2001 | Friendly Mortgage Co. | E | 524.12 | | 1423.92 |
| | | This transaction was downloaded from your bank and does not match any entries you made. | | | | |
| | | Bank's entry: FRIENDLYMORTGAGE CK2004 $524.12 | | | | |
| | | ACCEPT   MORE... | | | | |
| 2005 | 10/20/2001 | Friendly Mortgae | | 542.12 | | 881.80 |

FIG. 10

Transaction Detail:

| Num | Date | Payee | Amount |
|---|---|---|---|
| 2004 | 10/19/2001 | Friendly Mortgage Co. | $524.12 |

● This transaction should be entered as a new transction

○ This transaction should be matched to a pre-existing transaction from the register:

| | Num | Date | Payee | Amount |
|---|---|---|---|---|
| ☐ | 2005 | 10/20/2001 | Friendly Mortgae | ($542.12) |
| ☐ | .... | .... | .... | .... |
| ☐ | .... | .... | .... | .... |
| ☐ | .... | .... | .... | .... |
| ☐ | .... | .... | .... | .... |

OK   CANCEL

FIG. 11

| Num | Date | Payee | C | Payment | Deposit | Balance |
|---|---|---|---|---|---|---|
| 2002 | 10/09/2001 | Acme Insurance | | 85.00 | | 1637.49 |
| ATM | 10/13/2001 | | | 40.00 | | 1597.49 |
| | 10/14/2001 | ATM withdrawal | E | 100.00 | | 1497.49 |
| | 10/15/2001 | paycheck | E | | 850.55 | 2348.04 |
| 2003 | 10/19/2001 | Capital City Finance | | 400.00 | | 1948.04 |
| 2004 | 10/19/2001 | Friendly Mortgage Co. | E | 524.12 | | 1423.92 |
| | | This transaction has been merged with a manually entered transaction: | | | | |
| | | Bank's entry: FRIENDLYMORTGAGE CK2004 $524.12 | | | | |
| | | Your entry: Check 2005 Friendly Mortgae $542.12 | | | | |
| | | [ACCEPT]  [MORE...] | | | | |
| | | | | | | |
| | | | | | | |

FIG. 12A

| Num | Date | Payee | C | Payment | Deposit | Balance |
|---|---|---|---|---|---|---|
| 1999 | 09/22/2001 | Health Club | C | 100.00 | | 893.49 |
| 2000 | 09/25/2001 | Pizza Dude | C | 23.00 | | 870.49 |
| | 09/30/2001 | paycheck | C | | 800.00 | 1670.49 |
| 2001 | 10/07/2001 | City Power and Light | E | 52.00 | | 1722.49 |
| 2002 | 10/09/2001 | Acme Insurance | | 85.00 | | 1637.49 |
| ATM | 10/13/2001 | | | 40.00 | | 1597.49 |
| | 10/14/2001 | ATM withdrawal | E | 100.00 | | 1497.49 |
| | 10/15/2001 | paycheck | E | | 850.55 | 2348.04 |
| 2003 | 10/19/2001 | Capital City Finance | | 400.00 | | 1948.04 |
| 2004 | 10/19/2001 | Friendly Mortgage Co. | E | 524.12 | | 1423.92 |
| | | | | | | |
| | | | | | | |

FIG. 12B

| Num | Date | Payee | C | Payment | Deposit | Balance |
|---|---|---|---|---|---|---|
| 1999 | 09/22/2001 | Health Club | C | 100.00 | | 893.49 |
| 2000 | 09/25/2001 | Pizza Dude | C | 23.00 | | 870.49 |
| | 09/30/2001 | paycheck | C | | 800.00 | 1670.49 |
| 2001 | 10/07/2001 | City Power and Light | E | 52.00 | | 1722.49 |
| 2002 | 10/09/2001 | Acme Insurance | | 85.00 | | 1637.49 |
| ATM | 10/13/2001 | | | 40.00 | | 1597.49 |
| | 10/14/2001 | ATM withdrawal | E | 100.00 | | 1497.49 |
| | 10/15/2001 | paycheck | E | | 850.55 | 2348.04 |
| 2003 | 10/19/2001 | Capital City Finance | | 400.00 | | 1948.04 |
| 2004 | 10/19/2001 | Friendly Mortgage Co. | E | 524.12 | | 1423.92 |
| ATM | 10/21/2001 | | | 80.00 | | 1343.92 |
| 2005 | 10/22/2001 | Corner Grocery | | 135.00 | | 1208.92 |
| ATM | 10/24/2001 | | | 40.00 | | 1168.92 |

FIG. 17

| Num | Date | Payee | C | Payment | Deposit | Balance |
|---|---|---|---|---|---|---|
| 2001 | 10/07/2001 | City Power and Light | E | 52.00 | | 1722.49 |
| 2002 | 10/09/2001 | Acme Insurance | | 85.00 | | 1637.49 |
| ATM | 10/13/2001 | | | 40.00 | | 1597.49 |
| | 10/14/2001 | ATM withdrawal | E | 100.00 | | 1497.49 |
| | 10/15/2001 | paycheck | E | | 850.55 | 2348.04 |
| 2003 | 10/19/2001 | Capital City Finance | | 400.00 | | 1948.04 |
| 2004 | 10/19/2001 | Friendly Mortgage Co. | E | 524.12 | | 1423.92 |
| ATM | 10/21/2001 | | | 80.00 | | 1343.92 |
| 2005 | 10/22/2001 | Corner Grocery | | 135.00 | | 1208.92 |
| | 10/23/2001 | ATM withdrawal | | 80.00 | | 1128.92 |
| 2006 | 10/23/2001 | Corner Grocery | | 53.00 | | 1075.92 |
| ATM | 10/24/2001 | | | 40.00 | | 1035.92 |

FIG. 18

| Num | Date | Payee | C | Payment | Deposit | Balance |
|---|---|---|---|---|---|---|
| 2001 | 10/07/2001 | City Power and Light | E | 52.00 | | 1722.49 |
| 2002 | 10/09/2001 | Acme Insurance | | 85.00 | | 1637.49 |
| ATM | 10/13/2001 | | | 40.00 | | 1597.49 |
| | 10/14/2001 | | | | | 1497.49 |
| | 10/15/2001 | | | | | 2348.04 |
| 2003 | 10/19/2001 | | | | | 1948.04 |
| 2004 | 10/19/2001 | | | | | 1423.92 |
| ATM | 10/21/2001 | | | | | 1343.92 |
| 2005 | 10/22/2001 | | | | | 1208.92 |
| | 10/23/2001 | | | | | 1128.92 |
| 2006 | 10/23/2001 | | | | | 1075.92 |
| ATM | 10/24/2001 | | | 40.00 | | 1035.92 |

WARNING

*You have exceeded your monthly cash withdrawal budget!*

| Num | Date | Payee | C | Payment | Deposit | Balance |
|---|---|---|---|---|---|---|
| 2001 | 10/07/2001 | City Power and Light | E | 52.00 | | 1722.49 |
| 2002 | 10/09/2001 | Acme Insurance | | 85.00 | | 1637.49 |
| ATM | 10/13/2001 | | | 40.00 | | 1597.49 |
| | 10/14/2001 | | | | | 1497.49 |
| | 10/15/2001 | | | | | 2348.04 |
| 2003 | 10/19/2001 | | | | | 1948.04 |
| 2004 | 10/19/2001 | | | | | 1423.92 |
| ATM | 10/21/2001 | | | | | 1343.92 |
| 2005 | 10/22/2001 | | | | | 1208.92 |
| | 10/23/2001 | | | | | 1128.92 |
| 2006 | 10/23/2001 | | | | | 1075.92 |
| ATM | 10/24/2001 | | | | | 1035.92 |

CAUTION

*You only have have $12.00 remaining in your monthly food budget!*

AUTOMATED FINANCIAL REGISTER RECONCILIATION IN A COMBINED USER INTERFACE

FIELD OF THE INVENTION

This invention relates to software and methods for financial management, and more particularly, to automatically combining the display of manually entered data and of electronically downloaded data into a single user interface.

BACKGROUND OF THE INVENTION

Maintaining accurate information for a financial account can be tedious and time-consuming. Using a personal checking account as an example, the account holder must usually enter each transaction (e.g., a check, deposit, ATM withdrawal, etc.) into a record of some type, such as a checkbook register or a ledger. This information recorded by the account holder must then be periodically reconciled against the records of the bank or other institution providing the account, commonly called balancing the checkbook. This reconciliation typically involves comparing entries made by the account holder in a check register or other record with a bank statement listing transactions that have "cleared" the bank (i.e., have been processed by the bank), as well as with the account balance shown in the bank's records. In many cases, often because of failure to record all transactions and/or mistakes in recording transactions, there is not a perfect correlation between the data in the account holder's records and the bank statement. Any conflicts between the two records must then be resolved, and the two records synchronized. If the account holder's records are not periodically reconciled against the financial institution's records, he or she will not have an accurate understanding of his or her finances, and risks being overdrawn or other unpleasant consequences.

Home computers and other types of electronic data storage and processing devices have been used to automate some of this record keeping. One of the first steps was moving the account holder records from a paper check register or similar document into a home computer or other similar device. Although offering advantages over a pure paper system, this alone does not significantly alleviate the problems associated with periodic account reconciliation. In particular, if the account statement from the bank or other financial institution is still in paper form, reconciling the account holder's records and the bank records remains essentially the same process. The only difference is that instead of placing marks or other indicia in a check register or other paper document to indicate that a check or other transaction has cleared the bank, and/or agreement with the bank's description of the transaction or resulting account balance, the account holder simply revises an electronic check register based on a paper account statement. Moreover, until the account holder reconciles the account statement with the electronic check register, information from the statement cannot be used in the account holder's financial decision-making.

Receiving account information electronically is also known. Instead of receiving a paper account statement in the mail, the account statement can be periodically downloaded into a home (or other) computer, and that downloaded statement then compared to data input by the account holder. This fails to solve many problems associated with account reconciliation, however. In particular, most account holders do not wish to rely solely on a bank's account records, and there remains a need to periodically reconcile account holder (customer) records and account provider (bank) records.

Traditionally, personal finance software has kept user-entered account data and electronic bank statement data separate. In order to reconcile the two data sources (i.e., to "balance" the account), a special tool is implemented. This often involves calling a separate subroutine or program to combine the two data sources and permit the account holder to resolve conflicts. This also presents problems. The account holder must know to use this tool, and how to use the tool, to take advantage of the downloaded data. The account holder must also traverse between the transaction register and this reconciliation tool in order to compare possible entries and see if duplication has occurred. Furthermore, other components of the software (e.g., budgeting, etc.) cannot use the newly acquired data until these steps are performed. Even if both the bank statement and the check register are in electronic form, data in the bank statement is not used in the account holder's financial decision-making until the account holder initiates the reconciliation process.

U.S. Pat. No. 6,006,204, titled "Correlating Transaction Records Via User-Specified Identifier Creating Uncleared Transaction," discloses a method whereby an account holder is able to create records of uncleared transactions in a financial institution's account ledger. The uncleared transaction record is treated as an account comment, but the account balance is not modified until the transaction actually clears. For this and other reasons, this patent fails to solve many of the problems described above.

SUMMARY OF THE INVENTION

This invention combines, into a single user interface, transaction data entered by an account holder with account data downloaded from a financial institution or other account provider. This combination provides benefits not previously available, such as continuously updated running balances, convenient access to both sources of data, and increased visibility of new data.

In one computer program embodying the invention, there are two groups of transaction data. The first group includes "Historical" transaction data that has been manually entered by the account holder (the program user), as well as previously downloaded data that the user has already reconciled with manually entered data. The second group includes newly downloaded data. Downloaded data is acquired through a transfer process that can be initiated by the user, or that can be an automated process such as a scheduled download on a background program thread. That downloaded data can include information regarding individual transactions, regarding account balances, etc. A matching algorithm classifies each newly downloaded transaction as a Guaranteed Match, a Probable Match, or a Probable New. A transaction may be a Guaranteed Match if it has a unique identifier that generates a match that cannot be compromised. For example, the program attempting to match the transaction may have generated that transaction as an electronic payment or transfer. A transaction may be a Probable Match if it appears to be a match based on identifiers such as check number, date or amount, but the match cannot be guaranteed due to repeat transactions (e.g., two ATM withdrawals of $20 on the same day), user error during the manual entry phase, or other reasons. If a transaction's matching characteristics are not of a sufficiently high probability, it may be classified as a Probable New. Probable Match and Probable New transactions are roughly the same, except that the probability of a match is greater or lesser than a designated threshold.

Once the matching algorithm finishes, the newly downloaded Guaranteed Match, Probable Match and Probable New Transactions are stored and presented with Historical Transactions in a single combined user interface. In one embodiment of the invention, that interface includes a display of the data in a format resembling a conventional checkbook register. Within that interface, each transaction type can be presented in a different way to indicate its classification and to allow for user interaction. Newly downloaded transactions can be presented to the user as such so that the user realizes there are new transactions. Moreover, algorithmic matching results that are not guaranteed can also be brought to the user's attention. If a Probable Match should be a new transaction, or a Probable New should match a Historical transaction, the user can alter the transaction's classification. Any additional functionality created by the algorithmic matching can also be exposed.

The entire process from download to matching algorithm can be carried out in the background, such that no user intervention is required. If the user does not need to instantiate the matching algorithm by entering a reconciliation tool, other portions of the program (or indeed, other programs) can access the downloaded transactions and resulting balances.

BRIEF DESCRIPTION OF THE DRAWINGS

FIG. 4 is a representation of a portion of a user interface according to one embodiment of the invention.

FIG. 5 is a representation of a user interface after download of new transactions.

FIG. 6 is a representation of a user interface showing additional details about a selected transaction.

FIG. 7 is a representation of a user interface after acceptance of a Probable Match transaction.

FIG. 8 is a representation of a user interface showing additional details about a selected transaction.

FIG. 9 is a representation of a user interface after acceptance of a Probable New transaction.

FIG. 10 is a representation of a user interface showing additional details about a selected transaction.

FIG. 11 is a representation of a Transaction Detail interface for a selected transaction.

FIGS. 12A-B are representations of a user interface after matching a Probable New transaction to a Historical transaction.

FIG. 17 is a representation of a user interface showing additional user-entered transactions.

FIG. 18 is a representation of a user interface showing additional downloaded transactions.

FIGS. 19-20 are representations of a user interface showing budgetary warnings.

DETAILED DESCRIPTION OF THE INVENTION

An aspect of this invention combines financial transaction data, entered by a financial account holder, with account data downloaded from a financial institution (or other account provider) into a single user interface (UI). This provides benefits not previously available, such as continuously updated running balances, more convenient access to both sources of data, increased visibility of new data, and simplified account reconciliation. The invention will be described using a personal checking account provided by a bank as an example. It will be appreciated, however, that the invention is likewise applicable to savings accounts, stock accounts, credit card accounts, lines of credit, and other arrangements by which one party (the "account holder") maintains funds or other financial rights with another party (the "account provider" or "financial institution").

Figure 1:
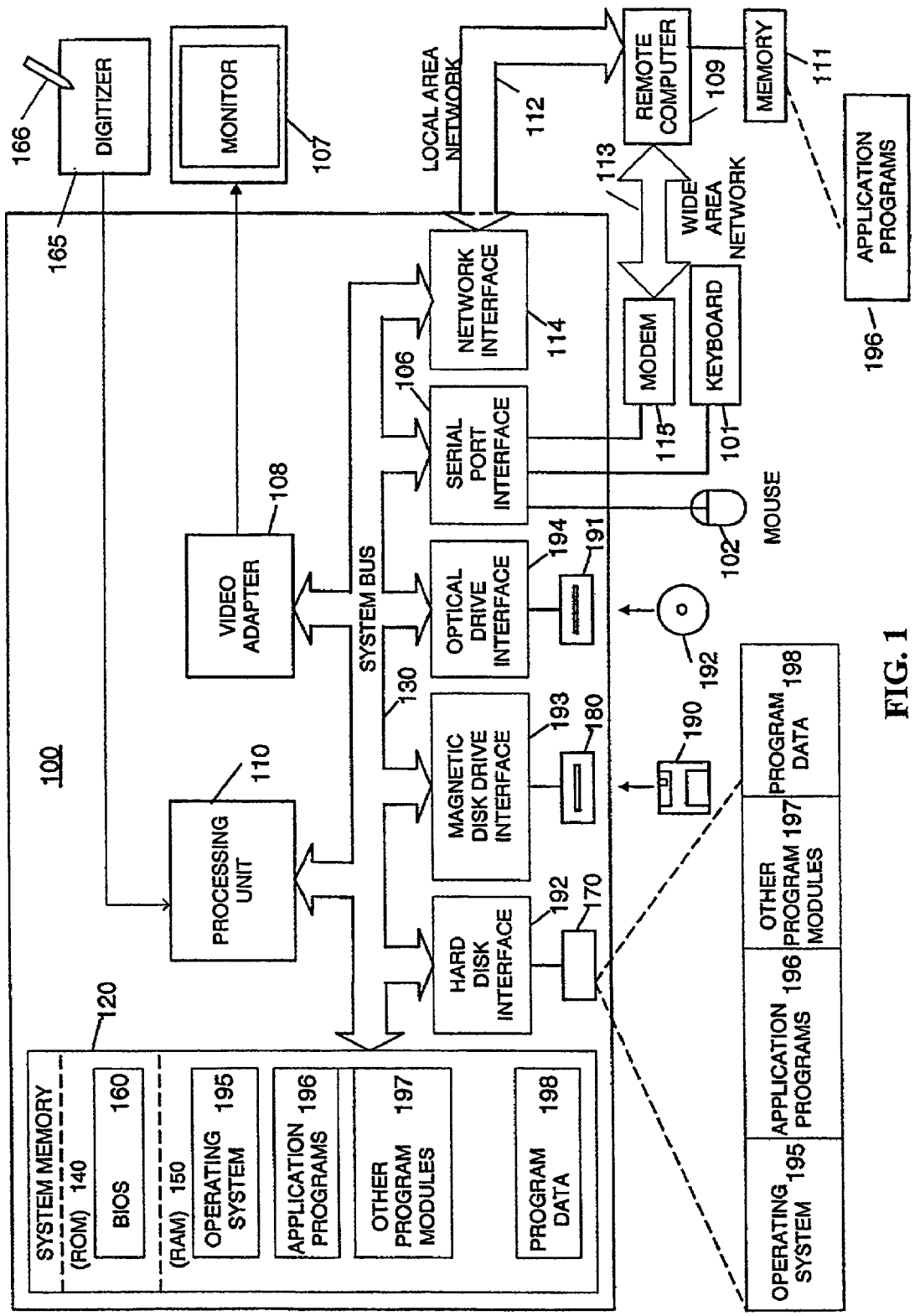
FIG. 1 is a block diagram of a conventional general purpose digital computing environment.

The invention will further be described in terms of a software program operating on a home computer. One example of such a computer environment in which the invention can be implemented is shown in FIG. 1. Computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any variety of bus architectures. The system memory 120 can include read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 can also include a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable and computer executable instructions, data structures, program modules and other data for the computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 170 or other type of display device is also connected to the system bus 130 via an interface, such as a video adapter 108. In addition to the monitor, computers typically include other peripheral devices such as speakers (not shown), as well as printers or other devices for graphically presenting output (also not shown). A pen digitizer 165 and accompanying pen or stylus 166 may also be provided in order to digitally capture freehand input. Although a direct connection between the pen digitizer 165 and the processing input 110 is shown, the pen digitizer 165 may be coupled to the processing unit 110 via a serial port, parallel port or other interface and the system bus 130 as known in the art. Furthermore, although the digitizer 165 is shown apart from the monitor 107, the usable input area of the digitizer 165 could be co-extensive with the display area of the monitor 107. Further still, the digitizer 165 may be integrated in the monitor 107, or may exist as a separate device overlaying or otherwise appended to the monitor 107.

Computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device. The network connections shown are exemplary and other techniques for establishing a communications link between computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Although an exemplary computer environment has been described, persons skilled in the art will appreciate that the invention can also be implemented on other data storage and processing devices. Software implementing the invention can take many forms: a separate application program; one or more subroutines of a larger program; or any other arrangement of instructions enabling a device to carry out the processes described herein. Unless indicated otherwise, "user" refers to an account holder utilizing a program embodying the invention.

Figure 2:
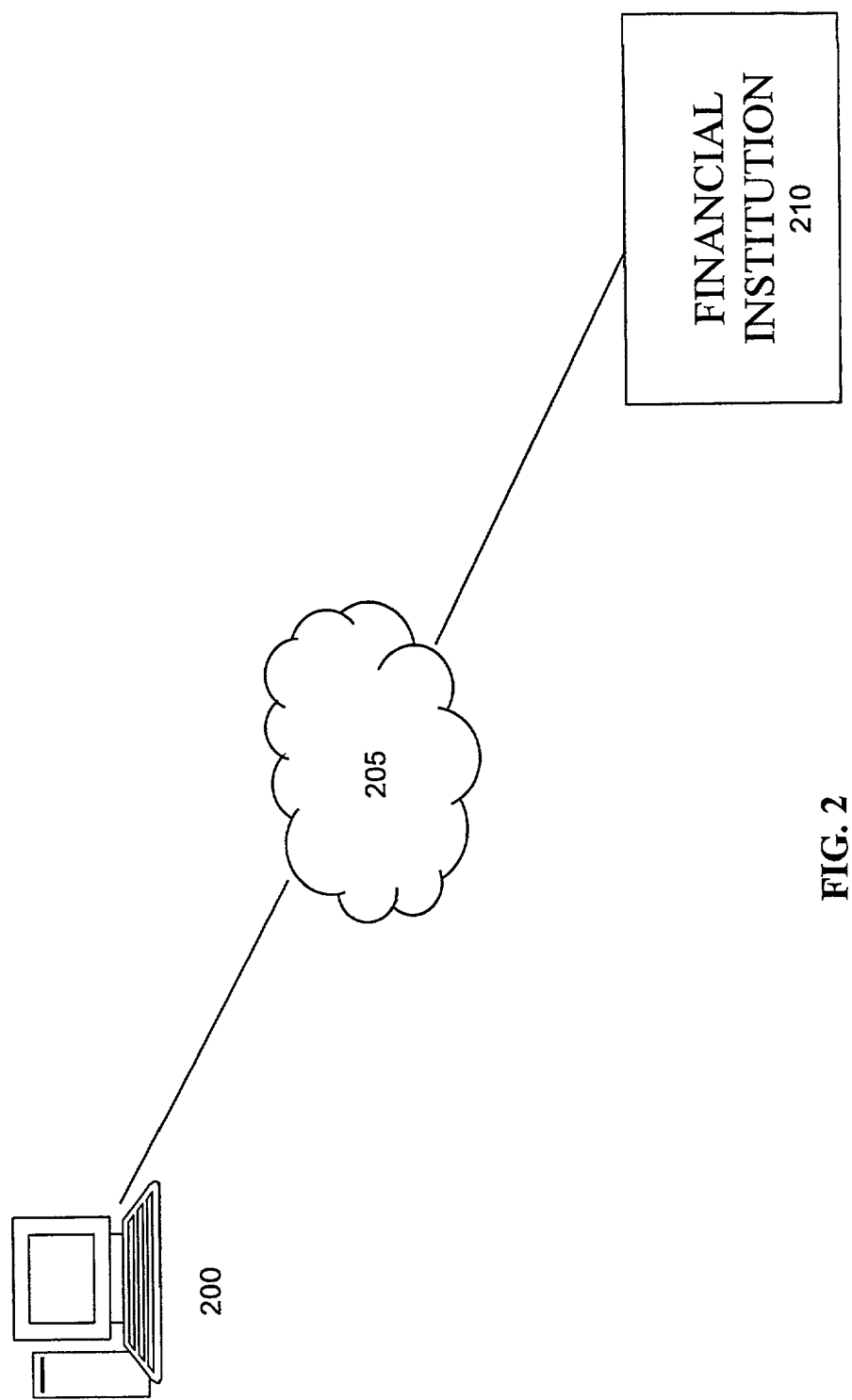
FIG. 2 is an overview diagram of the operation of an embodiment of the invention.

FIG. 2 is a high-level overview diagram of one embodiment of the invention. An account holder/user maintains records of account activity on home computer 200. Home computer 200 may be computer 100 of FIG. 1, but the invention could also be implemented on other devices (or combinations of devices) with data processing and storage capability, such as networked computers, Personal Digital Assistants (PDA), a terminal accessing a remote processor and/or storage, etc. Computer 200 communicates, via network 205, with a financial institution 210. Network 205 can be the Internet, a dial-up connection, a direct data link, or any other data connection. Similarly, financial institution 210 could be any entity providing an account. In one embodiment of the invention, computer 200 accesses financial institution 210 via a secured web site on the World Wide Web ("WWW"). Persons skilled in the art will appreciate that financial institution 210 may connect to the WWW via intermediate entities such as, e.g., Internet Service Providers or entities providing web site hosting services. Indeed, there may be numerous other facilities situated between financial institution 210 and computer 200, all of which are known in the art and the details of which are not necessary for a full explanation of the invention.

Figure 3:
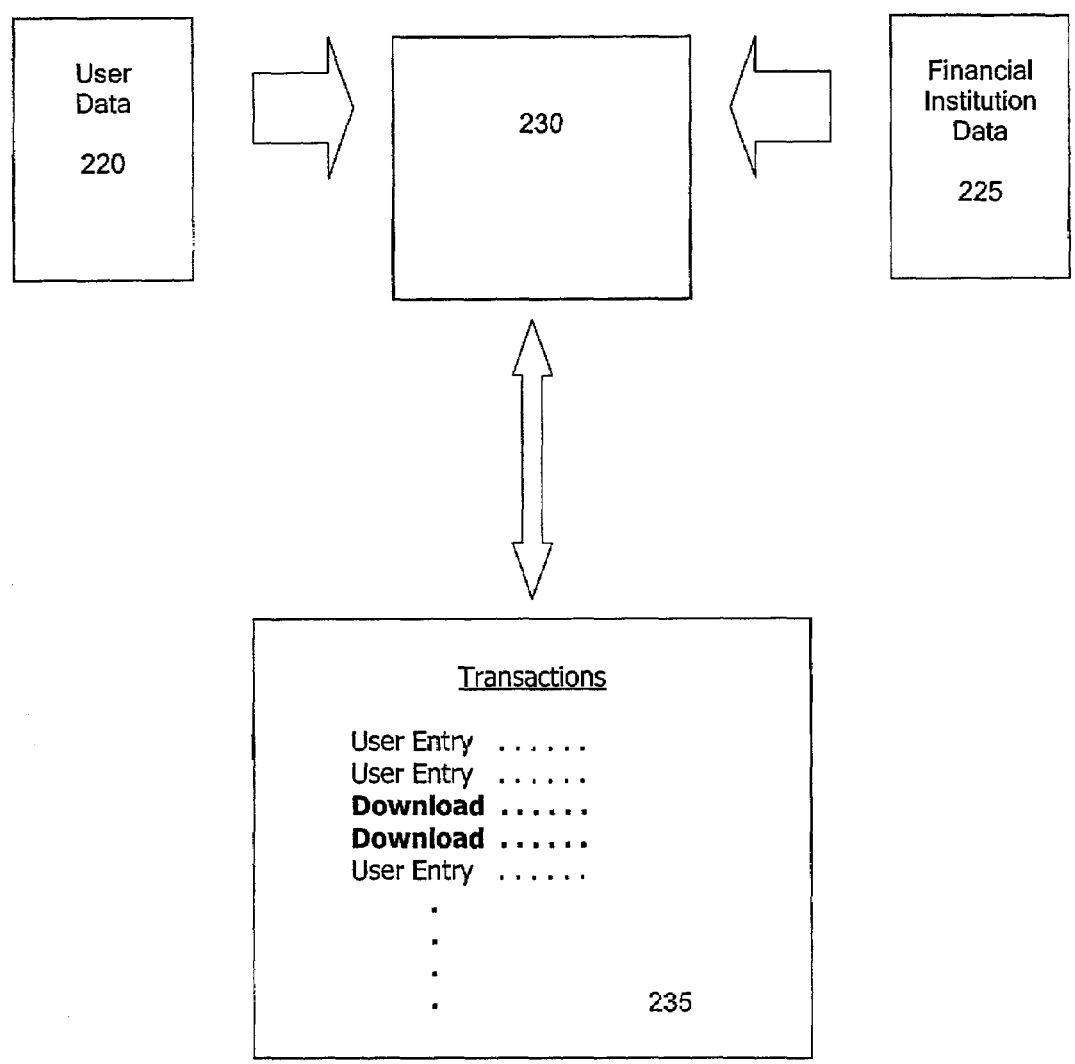
FIG. 3 is an overview diagram of a computer program implementing an embodiment of the invention.

FIG. 3 is a block diagram of an application program 230 implementing one embodiment of the invention. Program 230 may contain numerous modules, subroutines, links to other programs, etc. to facilitate storing and processing data. Two types of input data are represented by boxes 220 and 225. Box 220 represents data input by the user. The user may input data 220 using a mouse and/or keyboard; may download data to computer 200 from a PDA or other device (including another computer on a home network or elsewhere), or by other methods. The user may provide data 220 to program 230 solely to document prior transactions such as deposits, withdrawals or payments. For example, the user may have written a check to a store, and upon returning home, provided data about that purchase (e.g., check number, amount, payee, date, etc.) to program 230. User-entered data may also reflect transactions initiated by the user on computer 200 using program 230 (or other another program); examples could include an online purchase, electronic bill payment, electronic funds transfers, using computer 200 and an attached printer (not shown) to write a check, etc. Box 225 represents data received from financial institution 210 via, e.g., network 205. In one embodiment of the invention, financial institution data 225 comprises data similar to what would be provided in a conventional (i.e., paper) account statement: transactions on the account processed by the financial institution in a particular period, account balance, etc.

Software 230 displays and allows user interaction with data from sources 220 and 225 via a graphical User Interface ("UI") 235. As shown in FIG. 3, interface 235 presents both user-entered data 220 and downloaded data 225 in a single interface. User interface 235 may be, for example, a computer screen display with various fields setting forth account data, and allowing the account holder to enter and/or manipulate data in some or all of those fields. User Interface 235 may simulate a browser interface, allowing the user to access additional screens by mouse clicking on hypertext. In one embodiment of the invention, user interface 235 comprises a screen display portion simulating a checkbook register. FIG. 4 illustrates one possible format for such an interface. The display shown in FIG. 4 could be part of a larger display, and could appear as a "pane" or "frame" of a screen display having multiple panes or frames. Similar to a conventional (paper) check register, the interface in FIG. 4 has a column for check numbers or other indicia to identify transactions ("Num"); a column for transaction date; a column for indicating a payee or other descriptive information ("Payee"); a column usable to indicate transaction source or status ("C"); a column for amounts paid or otherwise withdrawn from the account ("Payment"); a column for deposits or other amounts received into the account; and a column for the account balance. The interface could also have a "scroll bar" (shown in FIGS. 4-10, 12 and 17-20 as a black square in a column) or other affordance allowing the user to see additional rows of transaction data. By selecting a particular transaction (by, e.g., moving a cursor over a field or portion of a field, by tabbing over to highlight a field, by clicking upon hypertext, etc.), additional information can be provided. Some of the entries may also comprise hypertext; by mouse clicking on such text, the user may access other frames and/or screens of data. In one embodiment of the invention, selecting a row of the register expands the row to provide more information, as is described below. Alternatively, information about the transactions could be provided without collapsing (or fully collapsing) the rows.

So as to provide a starting point for explaining an embodiment of the invention, the interface of FIG. 4 only depicts transactions that have previously been entered by the user or which may otherwise be "Historical" (e.g., downloaded transactions which have previously been accepted by the user as reconciled with bank records). At some later point, additional data is downloaded or otherwise received from the financial institution regarding transactions that have occurred, similar to an account statement. In one embodiment of the invention, this download occurs in a background program thread, and does not require initiation by the user. For example, the program may be configured to periodically connect to a data network, such as the Internet, and access a source of account data, such as a financial institution's secure website.

Program 230 classifies each newly-downloaded transaction. A transaction may be a "Guaranteed Match" to a user-entered transaction. A Guaranteed Match is a transaction for which there is sufficient certainty regarding a matching user-entered transaction such that there is virtually no doubt about the correlation. For example, program 230 may have originally generated the transaction as an electronic payment or transfer. Because the transfer is a Guaranteed Match, the user may not be allowed to alter the transaction, and may only be allowed to "accept" it. Although it is a Guaranteed Match, the transaction is rendered in bold or otherwise marked as unaccepted until the user reviews and accepts it; in this way, the user is assured to be made aware of the transaction. A newly-added transaction may also be a "Probable Match." A Probable Match is a transaction for which the program has identified a potentially corresponding user-entered transaction, and this proposed match is presented to the user. The user can then accept the match; instruct the program to match the downloaded transaction to another user entry; or instruct the program to treat the transaction as a new transaction. A "Probable New" is a transaction which does not appear to match any of the user-entered transactions. This transaction is presented to the user as one which does not match a user entry, and which appears to be a new transaction. The user can then accept the downloaded transaction as a new transaction, or can instruct the program to instead match it to another transaction.

Various algorithms can be employed to assign initial status of Guaranteed Match, Probable New or Probable Match. A transaction may be a Guaranteed Match based on a unique transaction identifier number, based on a prior user decision that all transactions of a certain type would be considered Guaranteed Matches, or by other methods. A transaction may be a classified as a Probable Match or Probable New based on amounts (or less than a certain difference in amounts) of user-entered and downloaded transactions; based on check number, payee description, or other transaction identifier; based on date of transaction; based on a combination of these criteria; or based on other criteria. These criteria may be modifiable by the user.

All downloaded transactions, regardless of status, are automatically displayed in the register. In other words, newly-downloaded transactions are not segregated from transactions already in the register pending some additional user instruction (e.g., instructing program 230 to reconcile a downloaded statement with manual register entries). Newly-added transactions can be highlighted by the program to alert the user to their presence. In the example, newly-downloaded transactions are rendered in bold (similar or "unopened" e-mail messages in many e-mail programs) to advise the user that the transaction has either not been reviewed, or that it was reviewed but not accepted or modified. Until the user accepts the transaction, or modifies it and then accepts it, it will continue to be rendered in bold. The account balance is immediately adjusted for each transaction in the register, regardless of whether it has been accepted. For example, all Guaranteed Match withdrawals, Probable Match withdrawals and Probable New withdrawals are subtracted from the account balance. The transaction classification may later change, and the final balance may be modified. For example, the user may elect to match a downloaded transaction to a user-entered transaction other than a transaction suggested by the program. Even before newly-downloaded transactions are reviewed however, and before any such adjustments made, the balance shown in the register will be more accurate and more useful than would be the case if the new transactions had not been put into the register.

All of the account data is presented to the user in a single combined interface. A user examining the electronic register is thus made aware that there are newly downloaded transactions which should be reconciled, and that the account balance may be different from what would result from only user-entered transactions. Maintaining account data in a single interface also allows the user to reconcile the account in a piecemeal fashion. For example, the user may receive one or more downloads that represent a number of transactions, and the user may not have time to immediately reconcile the account records. Because all transactions are presented in a single interface, the user can reconcile a few at a time (or however many the user may wish) and still be aware which transactions have yet to be reviewed.

FIG. 5 shows an example interface reflecting newly-downloaded transaction data. The first newly-downloaded transaction in FIG. 5 is check number 2001, to "City Power and Light," for $52.00. This entry is displayed in bold type, similar to the way unopened e-mails are presented in some e-mail software, so as to notify the user that this transaction is one that the user has not yet accepted. The entry also displays an indicator in the far left column (in this example, a "!") that this transaction has been classified as a Probable Match. Although not required, each downloaded transaction can also be marked with an "E" to signify that the transaction represents one electronically received from the bank.

In one embodiment, each newly-downloaded transaction can be displayed in a "collapsed" row so as not to obscure other rows. Once the user selects a transaction (e.g., by clicking upon the row, by hovering the cursor over the row, or by other means), the row can be expanded to provide additional information about the transaction. As illustrated in FIG. 6, the example display shows additional information provided about the "City Power and Light" entry once the user selects that transaction. In the example, the row containing this transaction expands. In other embodiments, the user might be directed to a new screen. In still other embodiments, the rows might not be collapsed or may only be partially collapsed. As can be seen in FIG. 6, program 230 has classified this transaction as a Probable Match. The user entry and the downloaded data are presented for comparison, and the user is given the choice of accepting the match (by, e.g., selecting the UI affordance presented as an "ACCEPT" button), or to take other action (by, e.g., selecting the "MORE" button). In this example, the user chooses to accept the program's suggested match, and selects the "ACCEPT" button.

FIG. 7 illustrates the result of a user decision to accept a suggested match. The entry is no longer rendered in bold, and the indicator of a Probable Match ("!") is no longer present. The "E" is still present in the status column. Alternatively, the user could choose to place a "C" (for cleared), "R" (for reconciled) or other indicator in this column. Because only the City Power and Light transaction was reviewed and accepted, the display of the other newly-downloaded transactions has not been affected. Moreover, had the user selected this entry, but then selected another entry without accepting the City Power and Light entry (or accepting it as modified by the user), the City Power and Light entry would continue to be in bold. The user may elect to review and accept (or review and modify) other transactions. If the user does not do so, the transactions will continue to be signified as unaccepted until the user takes action. If, for example, the user closes and then restarts program 230, and then downloads additional transaction data, program 230 will continue to indicate transactions that have not yet been accepted or modified, as well as any subsequently-downloaded transactions that must be reviewed/accepted/modified. In other words, no distinction is necessarily made in the interface between unaccepted transactions from one download and unaccepted transactions from another download.

FIG. 8 illustrates a Probable New transaction. In this case, upon selecting the Oct. 14, 2001 "ATM withdrawal" transaction, the program indicates that it is unable to match this transaction with any transactions that the user previously entered. The user is provided with transaction details received from the bank (an ATM debit on Oct. 14, 2001, from an ATM located at 123 Main Street, for $100). The user may determine that he simply failed to enter this transaction into the computer, and that he will thus accept the program's classification as a new transaction. Upon this selection, the user is presented with the register shown in FIG. 9.

The user might then select the transaction for check 2004. As seen in FIG. 10, program 230 has classified this transaction as a Probable New, as it has not been able to locate any user-entered transactions that appear to match. Depending upon the algorithm implemented, this non-match could be because the amount of the downloaded transaction does not match (or is not close enough to) the amount of a user-entered transaction, because there is no user entry for check 2004, or for other reasons. The invention also contemplates algorithms that classify transactions according to multiple criteria. As but one example, the program could classify transactions as Probable Matches if the amounts are within a certain range of each other, the dates are within a certain range and the check numbers are within a certain range. Such an algorithm might be designed to, e.g., accommodate some users' tendencies to transpose digits in entries, to fail to record one check (and thereby introduce an undesired offset into other transaction check numbers), etc. Such matching algorithms could also be user definable and adjustable.

In this case, the user does not wish to accept the program's classification of the transaction as a Probable New, and accordingly selects the "MORE" button. The user is then provided with another display screen providing additional transaction detail, as shown in FIG. 11. In this exemplary details screen, the user is given the choice (via two "radio buttons") to leave the transaction classified as a new transaction or to match the transaction with a pre-existing transaction. Because the transaction was classified as a Probable New, the default choice is "this transaction should be entered as a new transaction." The default choice and the choices themselves could be different if the transaction as a Probable Match. In this case, the user elects to override the default, and selects the radio button corresponding to "the transaction should be matched to a pre-existing transaction from the register." The user then chooses the matching pre-existing transaction by "checking" the appropriate box. In the example of FIG. 11, only one pre-existing transaction is shown (check number 2005), with the presence of other entries indicated by multiple ellipses (". . ."). Persons skilled in the art will appreciate that the box listing pre-existing transactions can comprise a scroll bar or other UI affordance(s) that allows additional transactions to be displayed (and/or additional information about those transactions).

Upon review of the transaction detail screen of FIG. 11, the user deduces that he apparently transposed a "2" and a "4" when entering the amount, that he misspelled the payee, and that he entered the wrong check number when entering this transaction. Recognizing his error, he overrides the initial classification of the downloaded transaction as Probable New, and instructs the program to match the downloaded transaction with the user-entered transaction for check 2005. Upon selecting the "OK" button, the transactions are matched, and the user is shown the screen display of FIG. 12A. As can be seen in FIG. 12A, program 230 has replaced the user-entered data with the data downloaded from the bank, and has assumed the bank-supplied data is correct. In other embodiments, this assumption could be modified by the user. Because the user must still accept the transaction after reclassification, the "Accept" and "More" affordances are presented. As shown in FIG. 12B, upon acceptance of the reclassified transaction, the transaction is no longer rendered in bold.

FIGS. 13-16 provide a flow chart generally showing operation of one embodiment of the invention. Persons skilled in the art will recognize that various well-known steps are not shown, but are understood to be present. For example, many displays presented to a user may provide the user with the option of returning to the previous step (e.g., a "Cancel" button or similar affordance). As another example, various steps in FIG. 13 indicate the program being idle or performing other tasks; persons skilled in the art will recognize that operation of program 230 need not return to the process implementing the invention. In other words, execution of program 230 could terminate altogether, with the process of the invention reinstantiated at some later point.

Figure 13:
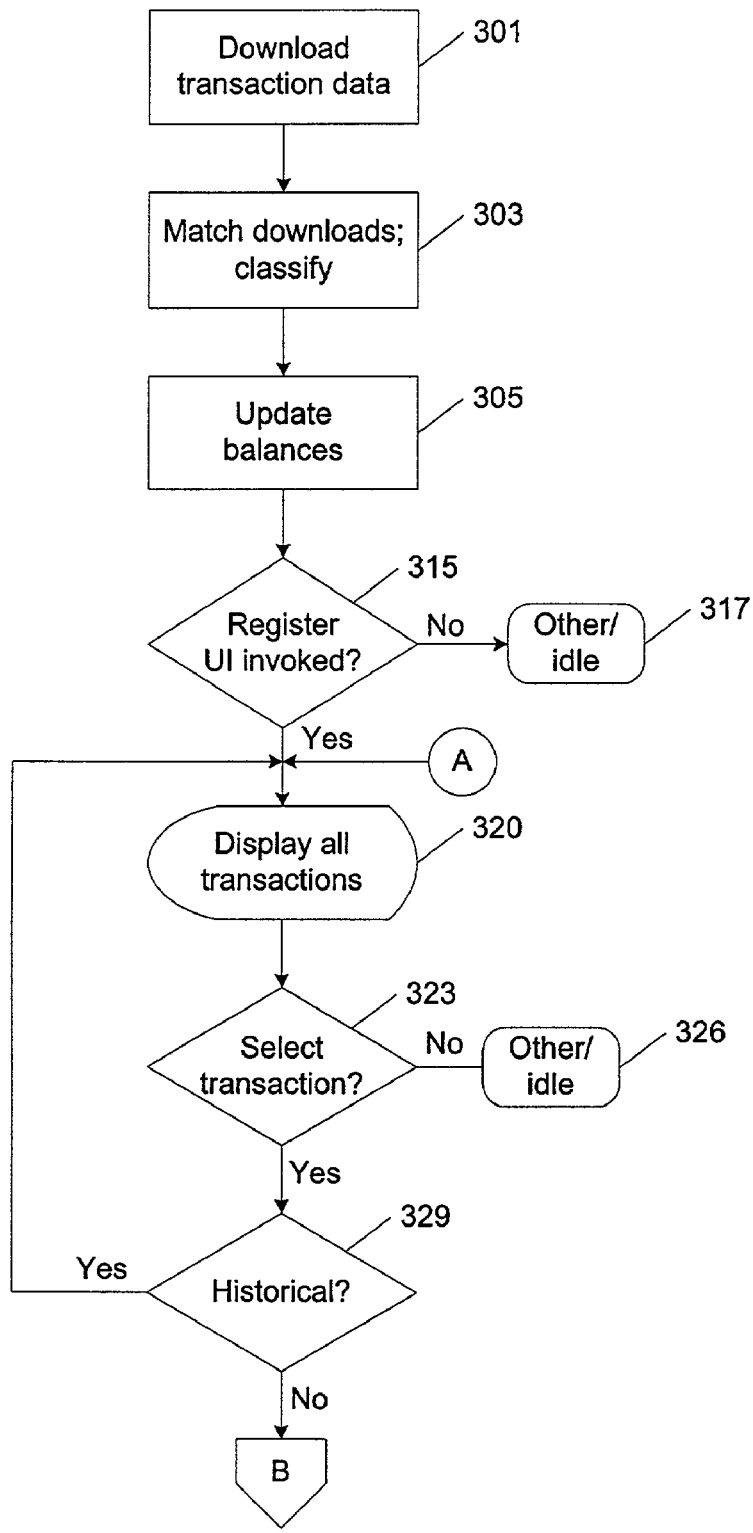
FIGS. 13-16 are flow charts showing operation of an embodiment of the invention.

Beginning at step 301 in FIG. 13, data is downloaded from financial institution 210 (FIGS. 2 & 3). This download can take place in a background thread of program 230, and can occur automatically or upon user instruction. After data is received from financial institution 210, program 230 classifies each newly downloaded transaction at step 303 as a Guaranteed Match, Probable Match or Probable New. As set forth above, various algorithms and criteria can be utilized for classifying each transaction. After all newly-downloaded transactions have been classified, they are added at step 305 to a data structure with Historical transactions and with unaccepted transactions from prior downloads, such that all transactions can be viewed in a single user interface. Running account balances may also be computed based on the newly-downloaded and classified transactions. For example, the amount of a check or other withdrawal classified as a Probable New transaction can be subtracted from the account balance, while a matching transaction (Guaranteed or Probable), would not affect the account balance if the amount of the downloaded transaction and the matched user-entered transaction are equal. In this regard, the program could be configured to classify transactions as matching even if the amounts do not match (e.g., a match chosen because of check number, other transaction identifier, etc.). If the amounts of the downloaded transaction and the matched user-entered transaction are not equal, the program could be further be configured to automatically treat the downloaded transaction amount as correct and replace the user-entered transaction amount with the downloaded amount, and to then update the account balance accordingly. Alternatively, the program could be configured to consider the user-entered transaction amount as correct or to prompt the user for further instructions.

Although not shown in FIG. 13, additional copies of data describing each newly-downloaded transaction may also be maintained separately so that the user can later reverse a decision to accept or modify a transaction classification. These separately maintained copies can be maintained for any desired period of time, although to avoid "file bloat," the copies may only be maintained for a certain period of time (e.g., 1 year).

At step 315 program 230 determines whether the transaction register interface has been invoked. If not, the program remains idle or performs other tasks at 317. The program may return to step 315 at a later point if the user invokes the transaction register interface. If the transaction register interface is invoked, all transactions are displayed at step 320. All unaccepted transactions are signified as such by, e.g., bold face rendering. If the user does not select one of the transactions at step 323, the program remains idle or performs other tasks at 326. If a transaction is selected, the program determines at step 329 if it is a Historical transaction. If so, no change in display is necessary, as Historical transactions are displayed without any special rendering or UI affordances (although other parts of the program may allow the user to edit the transaction). The user is (effectively) returned to step 320, and is able to select another transaction. Indeed, from the user's perspective, nothing may happen upon selecting a Historical transaction, as there is nothing to accept or modify.

Figure 14:
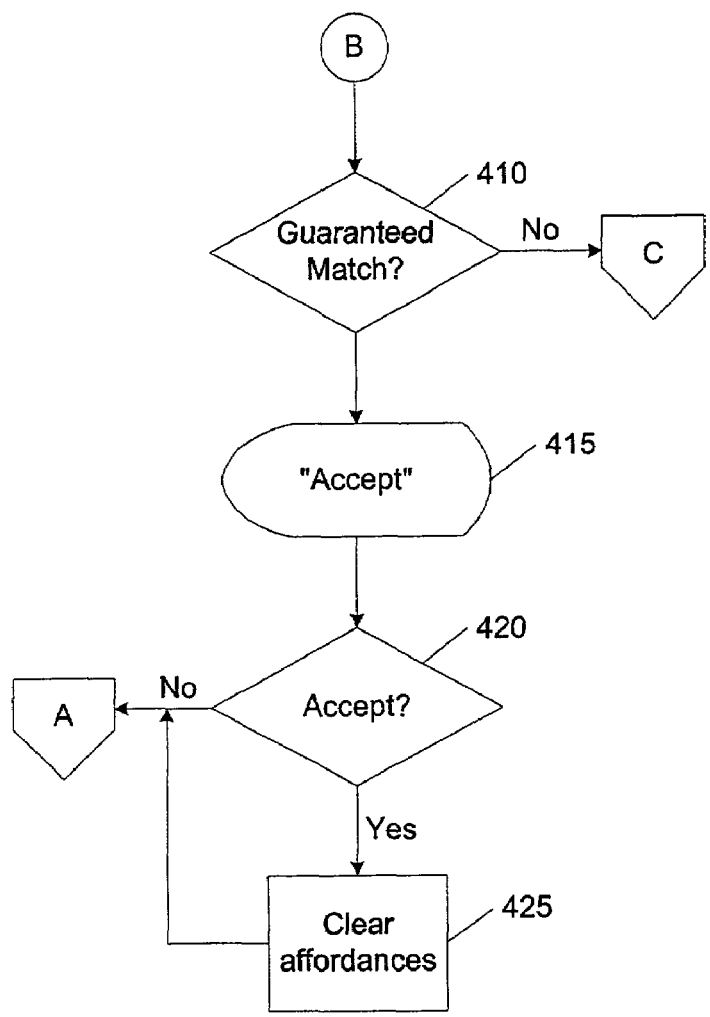
Figure 15:
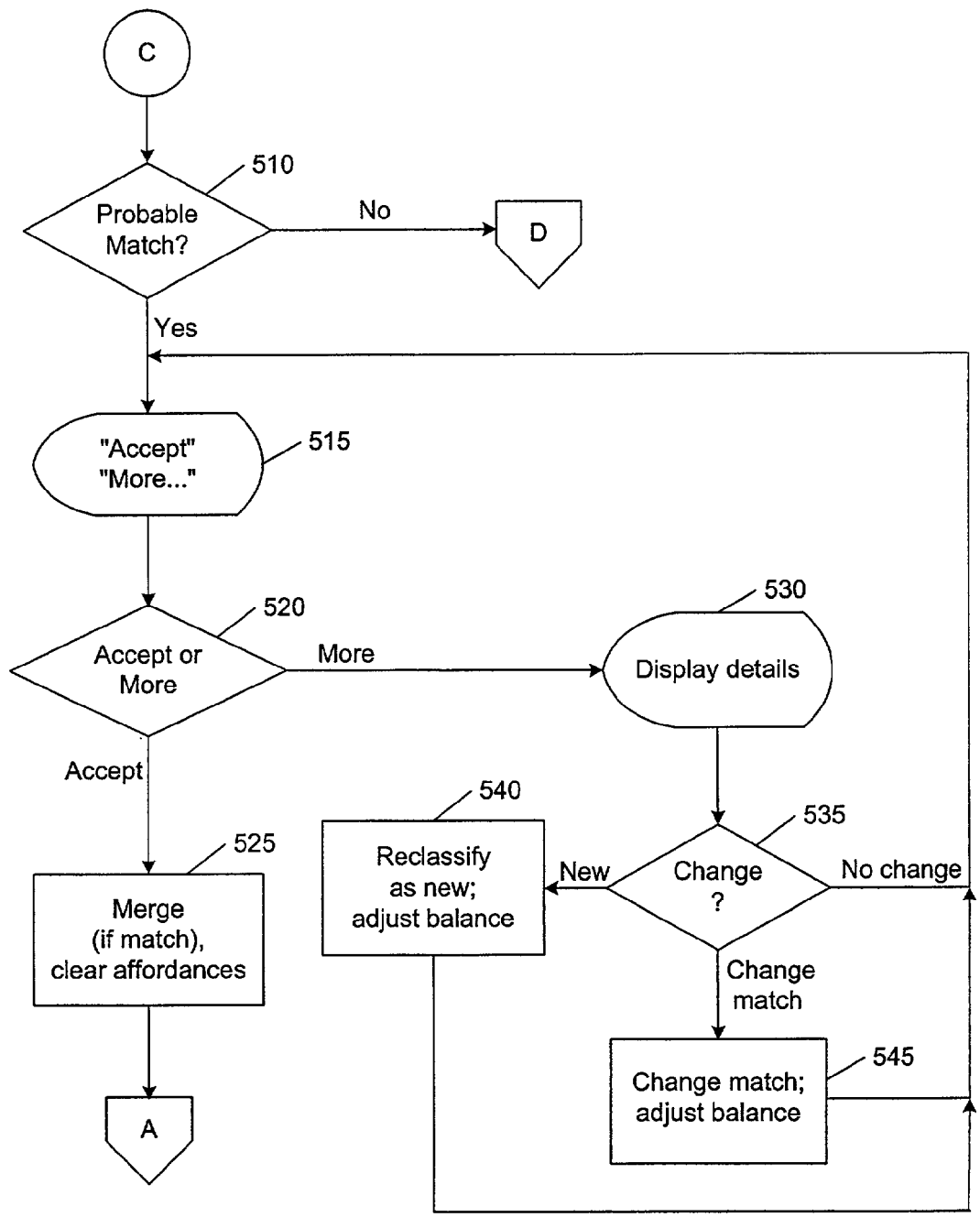
Figure 16:
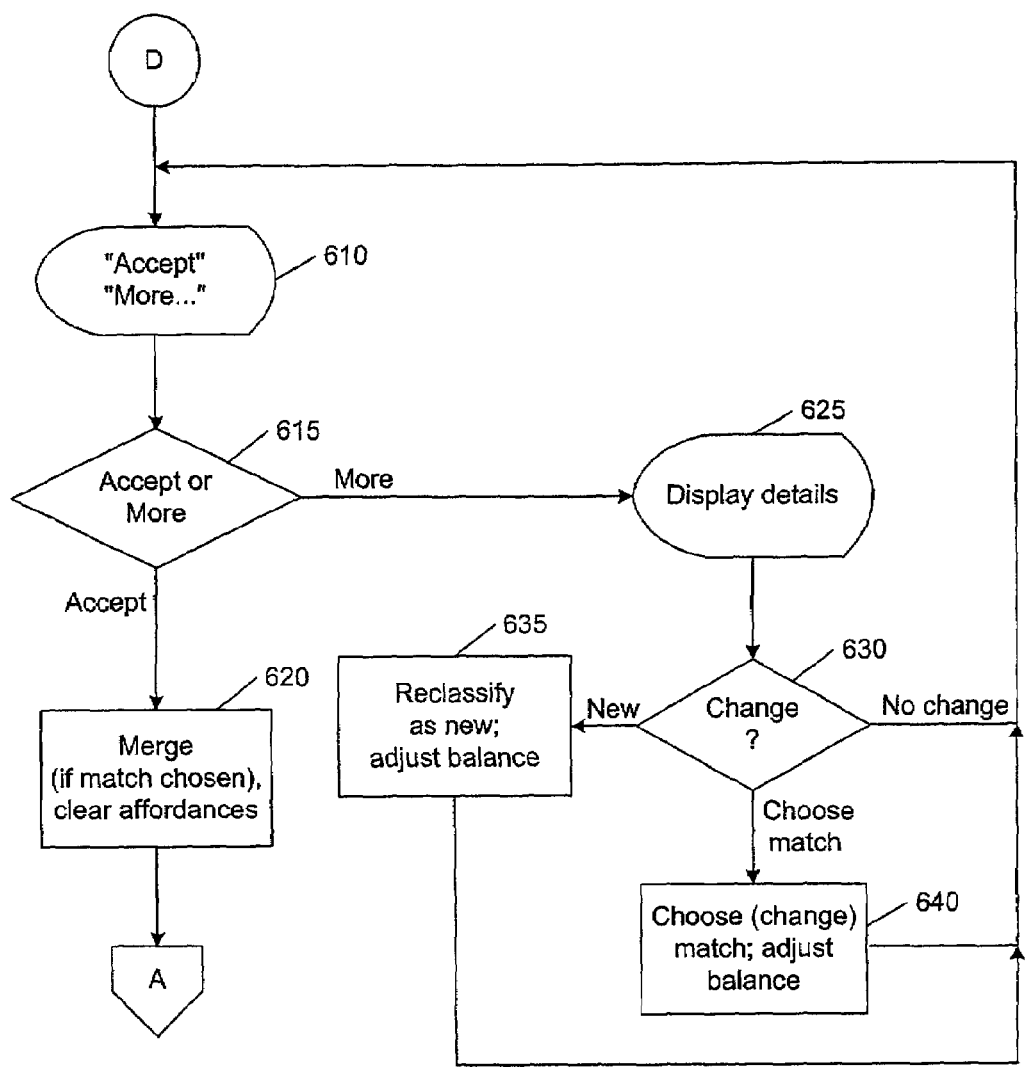

If the selected transaction is not Historical, program 230 proceeds, via connector B, to step 410 (FIG. 14). If the selected transaction is determined at step 410 to be a Guaranteed Match, the user is provided with an "Accept" button or similar affordance that allows the user to accept the match. If the user accepts this match at step 420, than at 425 the unaccepted transaction signifier (e.g., bold type face) and Accept button are cleared, the transaction becomes Historical, and the user is effectively returned (via connector A) to step 320 (FIG. 13), where the user is then able to select another transaction. If the user does not accept the transaction at step 420, the user is also returned to step 320 (FIG. 13) via connector A, but the Guaranteed Match remains in bold and does not become a Historical transaction.

If a selected transaction is not a Guaranteed Match at step 410, the program proceeds, via connector C, to step 510 (FIG. 15), and determines whether the selected transaction is a Probable Match. If so, the user is provided with options to either accept the proposed match or to seek other options (e.g., "Accept" button and "More" button affordances are displayed at step 515), and the transaction remains in bold until accepted. If the user accepts the proposed match at step 520, the newly-downloaded transaction and the proposed matching Historical transaction are merged at step 525, and the bold rendering and "Accept" and "More" affordances are cleared. The user is then returned, via connector A, to step 320 (FIG. 13), and is able to select another transaction. If the user does not accept the proposed match at step 520, the user is provided more details at step 530. At step 535, the user can elect to make no changes to the selected matching transaction, and is then returned to step 515. If at step 535 the user instead chooses to match the selected transaction to a transaction other than the transaction chosen by the program, that change is made at step 545, the account balance is adjusted, and the user is returned to step 515. As a third alternative at step 535, the user could have chosen to reclassify the selected transaction as a new transaction. If the user so chooses, the transaction is reclassified at step 540; the account balance adjusted, and the user is returned to step 515. Regardless of the choice made at step 535, the user is given the choice at step 520 to either accept the chosen match (or chosen reclassification as a new transaction) or to revise that choice by repeating steps 530, etc. When the user ultimately does accept the chosen match (or chosen reclassification as a new transaction), the selected transaction is merged with the chosen matching transaction (unless reclassification as new was chosen), the affordances cleared, and the user returned via connector A to step 320.

If at step 510 the selected transaction is not a Probable Match, the transaction is a Probable New. The program proceeds, via connector D, to step 610 (FIG. 16), where "Accept" and "More . . . " buttons are displayed, and the user is thereby provided with the option to accept the transaction as new or to seek other options. If at step 615 the user accepts the transaction as new, the affordances are cleared at step 620 and the user is returned (via connector A) to step 320 (FIG. 13) and able to select another transaction for review. If the user does not accept the transaction as new, and instead selects the "More" button, the user is provided more details about the transaction at step 625. At step 630, the user can elect to make no changes to the selected transaction's classification as a new transaction; in such case, the user is then returned to step 610. If at step 630 the user instead chooses to match the selected transaction to another transaction (i.e., reject the "Probable New" classification), that change is made at step 640, the account balance is adjusted, and the user is returned to step 610. Regardless of the choice made at step 630, the user is given the choice at step 615 to either accept the Probable New classification (or accept the chosen match), or to revise that decision by repeating steps 625, etc. If the user initially rejects the Probable New classification and chooses a matching transaction, and the user then repeats steps 625 and 630, the user can choose to reclassify the transaction as probable new. That change would be made at step 635, and the user returned to step 610. When the user ultimately does accept the chosen match or classification (or reclassification) as new, the selected transaction is merged with the chosen matching transaction (unless the transaction is classified as new), and the affordances are cleared. The user is then returned to step 320 (FIG. 13) via connector A and able to select another transaction for review.

As shown, program 230 does not wait for the user to instantiate a separate reconciliation program before adding transactions from downloaded data 225 into a User Interface for display with Historical transactions (e.g., transactions from user-entered data 220 and transactions that have previously been "accepted" or otherwise reconciled). In other words, transaction information contained in downloaded data 225 is immediately available upon download, and is not held in a suspense file or otherwise segregated until the user remembers to incorporate those transactions into the register. Moreover, the newly downloaded transactions can also be made immediately available to other parts of program 230 (or of other programs) for computational purposes. For example, program 230 may be configurable to group all expenses and income into multiple account categories. Program 230 might also allow a user to establish a budget for one or more categories. Whenever a check or other payment is made, the program 230 can then keep track of how much of the user's budget for that category has been spent.

For example, the user may have established a category of expenses called "Cash Withdrawal" for miscellaneous ATM withdrawals, checks cashed, etc. The category for a particular transaction could be shown in the same user interface described with regard to FIGS. 4-10, 12 and 17-20 (e.g., as a separate column in the register, as part of an augmented display upon expanding a selected row/transaction, etc.), or in a separate interface. Continuing the example, the user may have set a monthly Cash Withdrawal budget of $300.00. The user may have also established a budget category of "Food" for such things as groceries and dining out, and set a monthly Food budget of $200.00. Referring to FIG. 17, the user may then input two additional transactions into program 230. The first, check number 2005 for $135.00 to "Corner Grocery," is recognized by program 230 as a Food expense. Program 230 could recognize this expense as a Food expense through preconfiguration (e.g., the user setting up program 230 to recognize certain payees as food expenses); through explicit declaration by the user when the entry was input; or by numerous other methods known in the art. Another method for such categorization is disclosed in U.S. patent application Ser. No. 09/596,637, filed Jun. 19, 2000, titled "Automatic Categorization of Financial Transactions," the disclosure of which is incorporated by reference. Because check number 2005 is the first "Food" expense in the month of October, the user is within budget ($200.00–$135.00=$65.00). The second entry, an Oct. 24, 2001 ATM withdrawal of $40.00, is recognized by program 230 as a "Cash Withdrawal." Again, program 230 may recognize the category of the expense in various ways. In this case, however, the user has had numerous other ATM withdrawals during October 2001 ($40.00 on October 13, $100.00 on October 14, and $80.00 on October 21), and is closer to his budgetary limit of $300.00 By appropriately querying program 230 (by, e.g., opening another window, right-clicking on an ATM entry and selecting from a drop-down list, or other interface), the user could learn that he had spent $260.00 of his monthly Cash Withdrawal budget.

The user might then download additional data from the financial institution where he maintains the account. As seen in FIG. 18, the user failed to enter two transactions since his last download: an October 23 ATM withdrawal of $80.00 and an October 24 check (no. 2006) for $53.00 to "Corner Grocery." There is no match for these two transactions, and program 230 thus classifies each as a Probable New. Because these transactions are immediately added to the register, their impact upon overall account balance and upon affected categories' budgets can be immediately calculated. As seen in FIG. 19, program 230 could advise the user that he has exceeded his monthly Cash Withdrawal budget. This could occur by way of a "pop-up" window as displayed in FIG. 19 or by other means, and could occur automatically upon downloading of the new data, upon the user highlighting a transaction in the same category, upon the user attempting to initiate a new transaction, etc. Although not shown, the user could also be given options to obtain more information (via, e.g., a "Details" button), to revise the budget (via, e.g., a "Revise" button), or other options. Similarly, as shown in FIG. 20, the user can also be made aware that there is only $12.00 left in the monthly Food budget category.

By immediately placing downloaded transactions with user-entered transactions, the user is able to have more up-to-date financial information. If the downloaded transactions' budgetary impact was not calculated until the user invoked a separate reconciliation routine, he could easily exceed his budget. If, for example, the data for the check 2006 transaction was kept separate from the register until the user got around to balancing the account, he would be unaware that he was exceeding budget if he wrote a check for $20.00 to a "Food" payee.

Although a single example of carrying out the invention has been described, those skilled in the art will appreciate that there are numerous variations and permutations of the above described system and technique that fall within the spirit and scope of the invention as set forth in the appended claims. In addition to the alternatives and variations already discussed, further variations are possible and within the scope of the invention. For example, many of the steps in the flow chart of FIGS. 13-16 can be rearranged and/or combined, and additional steps added. In addition to a check register display, the program could provide other windows or sections for other information, such as when the last download occurred, the downloaded institutional balance, or commands to act on the transactions in a batch fashion. Other aspects of the UI could also be modified. As but a few examples, the "Accept" and "More" buttons could be affordances other than buttons, could be given different labels (e.g., "Accept" and "Change"), or could otherwise be modified. Other labels or other visual aspects of the UI could also be modified. A user could also be given options to accept all Probable New transactions, accept all Guaranteed Match transactions, accept all Probable Match transactions, etc. The user might also have a global option to accept all downloaded transactions if the user does not manually enter transactions (and therefore never needs to clear conflicts caused by algorithmic matching). Additional affordances could include an option to move between newly downloaded transactions (or some variation thereof) in case they are intermingled with numerous historical transactions and potentially out of view due to available screen size; and a filter that allows the user to only show newly downloaded transactions. In lieu of, or in addition to, the "buttons" and other affordances discussed above, a user interface according to the invention could implement context menus, shell-based navigational commands, dialog boxes and other means known in the art. These and other modifications are within the scope of the invention, which is only to be limited by the attached claims.

The invention claimed is:

1. A computer-implemented method of presenting information about financial account transactions based upon data received from a first source describing a first group of transactions and data received from a second source describing a second group of transactions, the method comprising:

receiving in the computer the data from the first source;

displaying information about the first-group transactions in a graphical user interface, wherein the graphical user interface is presented on a display device connected to the computer and is a tabularly formatted display of the first-group transactions;

receiving in the computer the data from the second source, wherein the second-group transactions have not been reconciled with regard to the first-group transactions, and wherein at least one first-group transaction and at least one second-group transaction are the same transaction;

displaying in the graphical user interface, without a separate user instruction to do so, information about the second-group transactions commingled with information about the first-group transactions;

classifying the second-group transactions based on probability of matching one of the first-group transactions, wherein the classifying is performed by the computer and without a separate user instruction to do so, and wherein said classifying further includes classifying a second-group transaction as a guaranteed match transaction if the data describing that second-group transaction sufficiently correlates with the data describing a matched first-group transaction so as to ensure that the guaranteed match transaction and the matched first-group transaction are the same, classifying a second-group transaction as a probable match transaction if the data describing that second-group transaction does not sufficiently correlate with the data describing any of the first-group transactions to qualify that second-group transaction as a guaranteed match transaction, but does sufficiently correlate with the data describing a probably-matched first-group transaction to indicate that the probable match transaction and the probably-matched first-group transaction have a designated probability of being the same, and classifying a second-group transaction as a probable new transaction if the data describing that second-group transaction does not sufficiently correlate with the data describing any of the first-group transactions to qualify that second-group transaction as a guaranteed match transaction or a probable match transaction;

calculating an account balance based on the first-group transactions and the second-group transactions without a separate user instruction to do so, wherein the calculating is performed by the computer, and as to each probable match transaction, the account balance is calculated based on the amount of only one of the probable match transaction and the corresponding probably-matched first-group transaction; and displaying the account balance in the graphical user interface.

2. The method of claim 1, further comprising:

providing the user an opportunity to acknowledge a guaranteed match transaction; and displaying the guaranteed match transaction, if acknowledged, in the same manner as a first-group transaction.

3. The method of claim 2, further comprising:

providing an opportunity to accept a probable match transaction;

displaying, if accepted, the probable match transaction in the same manner as a first-group transaction;

providing, if the probable match transaction is not accepted, an opportunity to select an alternate first-group transaction as a matching transaction;

merging, if an alternate first-group transaction is selected as a matching transaction, the probable match transaction with the alternate transaction, recalculating the account balance based on the merger, and displaying the merged transaction in the same manner as a first-group transaction; and reclassifying, if an alternate transaction is not selected as a matching transaction, the probable match transaction as a new transaction, recalculating the account balance based on the reclassification, and displaying the reclassified transaction in the same manner as a first-group transaction.

4. The method of claim 3, further comprising:

providing an opportunity to accept a probable new transaction;

displaying, if accepted, the probable new transaction in the same manner as a first-group transaction;

providing, if the probable new transaction is not accepted, an opportunity to select a matching transaction; and merging, if a matching transaction is selected, the selected matching transition with the probable new transaction, recalculating the account balance based on the merger, and displaying the merged transaction in the same manner as a first-group transaction.

5. The method of claim 4, further comprising:

receiving additional data from the second source describing additional second-group transactions before each second-group transaction described by previously-received second source data has been accepted, merged or reclassified;

classifying the additional second-group transactions;

recalculating the account balance based on the additional second-group transactions and displaying the recalculated account balance; and displaying in the graphical user interface, without a separate user instruction to do so and commingled with information about the first-group transactions, information about the additional second-group transactions.

6. The method of claim 5, wherein second source data is periodically downloaded over a data communication network on a background program thread.

7. The method of claim 4, further comprising, categorizing the first-group and the second-group transactions, wherein the categorizing is performed by the computer;

establishing a budgetary limit for at least one transaction category;

calculating an effect upon the budgetary limit caused by second-group transactions that are within the at least one category, wherein the calculating an effect is performed by the computer and without a separate user instruction to do so; and recalculating the effect upon the budgetary limit upon a user selecting an alternate transaction as a matching transaction, upon a user selecting a matching transaction for a probable new transaction, or upon a probable match transaction being classified as a probable new transaction, wherein the step of recalculating the effect is performed by the computer.

8. A computer-readable medium having computer-executable instructions for performing steps of a computer-implemented method of presenting information about financial account transactions based upon data received from a first source describing a first group of transactions and data received from a second source describing a second group of transactions, the steps comprising:

receiving in the computer the data from the first source;

displaying information about the first-group transactions in a graphical user interface, wherein the graphical user interface is presented on a display device connected to the computer and is a tabularly formatted display of the first-group transactions;

receiving in the computer the data from the second source, wherein the second-group transactions have not been reconciled with regard to the first-group transactions, and wherein at least one first-group transaction and at least one second-group transaction are the same transaction;

displaying in the graphical user interface, without a separate user instruction to do so, information about the second-group transactions commingled with information about the first-group transactions;

classifying the second-group transactions based on probability of matching one of the first-group transactions, wherein the classifying is performed by the computer and without a separate user instruction to do so, and wherein said classifying further includes classifying a second-group transaction as a guaranteed match transaction if the data describing that second-group transaction sufficiently correlates with the data describing a matched first-group transaction so as to ensure that the guaranteed match transaction and the matched first-group transaction are the same, classifying a second-group transaction as a probable match transaction if the data describing that second-group transaction does not sufficiently correlate with the data describing any of the first-group transactions to qualify that second-group transaction as a guaranteed match transaction, but does sufficiently correlate with the data describing a probably-matched first-group transaction to indicate that the probable match transaction and the probably-matched first-group transaction have a designated probability of being the same, and classifying a second-group transaction as a probable new transaction if the data describing that second-group transaction does not sufficiently correlate with the data describing any of the first-group transactions to qualify that second-group transaction as a guaranteed match transaction or a probable match transaction;

calculating an account balance based on the first-group transactions and the second-group transactions without a separate user instruction to do so, wherein the calculating is performed by the computer, and as to each probable match transaction, the account balance is calculated based on the amount of only one of the probable match transaction and the corresponding probably-matched first-group transaction; and displaying the account balance is the graphical user interface.

9. The computer-readable medium of claim 8 having further computer-executable instructions for performing the further steps of:

providing the user an opportunity to acknowledge a guaranteed match transaction; and displaying the guaranteed match transaction, if acknowledged, in the same manner as a first-group transaction.

10. The computer-readable medium of claim 9 having further computer-executable instructions for performing the further steps of:

providing an opportunity to accept a probable match transaction;

displaying, if accepted, the probable match transaction in the same manner as a first-group transaction;

providing, if the probable match transaction is not accepted, an opportunity to select an alternate first-group transaction as a matching transaction;

merging, if an alternate first-group transaction is selected as a matching transaction, the probable match transaction with the alternate transaction, recalculating the account balance based on the merger, and displaying the merged transaction in the same manner as a first-group transaction; and reclassifying, if an alternate transaction is not selected as a matching transaction, the probable match transaction as a new transaction, recalculating the account balance based on the reclassification, and displaying the reclassified transaction in the same manner as a first-group transaction.

11. The computer-readable medium of claim 10 having further computer-executable instructions for performing the further steps of:

providing an opportunity to accept a probable new transaction;

displaying, if accepted, the probable new transaction in the same manner as a first-group transaction;

providing, if the probable new transaction is not accepted, an opportunity to select a matching transaction; and merging, if a matching transaction is selected, the selected matching transaction with the probable new transaction, recalculating the account balance based on the merger, and displaying the merged transaction in the same manner as a first-group transaction.

12. The computer-readable medium of claim 11 having further computer-executable instructions for performing the further steps of:

receiving additional data from the second source describing additional second-group transactions before each second-group transaction described by previously-received second source data has been accepted, merged or reclassified;

classifying the additional second-group transactions;

recalculating the account balance based on the additional second-group transactions and displaying the recalculated account balance; and displaying in the graphical user interface, without a separate user instruction to do so and commingled with information about the first-group transactions, information about the additional second-group transactions.

13. The computer-readable medium of claim 12 wherein second source data is periodically downloaded over a data communication network on a background program thread.

14. The computer-readable medium of claim 11 having further computer-executable instructions for performing the further steps of:

categorizing the first-group and the second-group transactions, wherein the categorizing is performed by the computer;

establishing a budgetary limit for at least one transaction category;

calculating an effect upon the budgetary limit caused by second-group transactions that are within the at least one category, wherein the calculating an effect is performed by the computer and without a separate user instruction to do so; and recalculating the effect upon the budgetary limit upon a user selecting an alternate transaction as a matching transaction, upon a user selecting a matching transaction for a probable new transaction, or upon a probable match transaction being classified as a probable new transaction, wherein the step of recalculating the effect is performed by the computer.

15. A system for presenting information about financial account transactions based upon data received from multiple sources, comprising:

a display;

a memory; and a processor in communication with the display and memory, and configured to perform steps of a method of presenting information about financial account transactions based upon data received from a first source describing a first group of transactions and data received from a second source describing a second group of transactions, the steps including receiving the data from the first source, displaying information about the first-group transactions in a graphical user interface, wherein the graphical user interface is presented on the display and is a tabularly formatted display of the first-group transactions, receiving the data from the second source, wherein the second-group transactions have not been reconciled with regard to the first-group transactions, and wherein at least one first-group transaction and at least one second-group transaction are the same transaction, displaying in the graphical user interface, without a separate user instruction to do so, information about the second-group transactions commingled with information about the first-group transactions, classifying the second-group transactions based on probability of matching one of the first-group transactions, wherein the classifying is performed without a separate user instruction to do so, and wherein said classifying further includes classifying a second-group transaction as a guaranteed match transaction if the data describing that second-group transaction sufficiently correlates with the data describing a matched first-group transaction so as to ensure that the guaranteed match transaction and the matched first-group transaction are the same, classifying a second-group transaction as a probable match transaction if the data describing that second-group transaction does not sufficiently correlate with the data describing any of the first-group transactions to qualify that second-group transaction as a guaranteed match transaction, but does sufficiently correlate with the data describing a probably-matched first-group transaction to indicate that the probable match transaction and the probably-matched first-group transaction have a designated probability of being the same, and classifying a second-group transaction as a probable new transaction if the data describing that second-group transaction does not sufficiently correlate with the data describing any of the first-group transactions to qualify that second-group transaction as a guaranteed match transaction or a probable match transaction, calculating an account balance based on the first-group transactions and the second-group transactions without a separate user instruction to do so wherein, as to each probable match transaction, the account balance is calculated based on the amount of only one of the probable match transaction and the corresponding probably-matched first-group transaction, and displaying the account balance in the graphical user interface.

16. The system of claim 15 wherein the processor is further configured to:

provide the user an opportunity to acknowledge a guaranteed match transaction, and display the guaranteed match transaction, if acknowledged, in the same manner as a first-group transaction.

17. The system of claim 16 wherein the processor is further configured to:

provide an opportunity to accept a probable match transaction, display the probable match transaction, if accepted, in the same manner as a first-group transaction, provide, if the probable matching transaction is not accepted, an opportunity to select an alternate first-group transaction as a matching transaction, merge, if an alternate first-group transaction is selected as a matching transaction, the probable match transaction with the alternate transaction, recalculate the account balance based on the merger, and display the merged transaction in the same manner as a first-group transaction, and reclassify, if an alternate transaction is not selected as a matching transaction, the probable match transaction as a new transaction, recalculate the account balance based on the reclassification, and display the reclassified transaction in the same manner as a first-group transaction.

18. The system of claim 17 wherein the processor is further configured to:

provide an opportunity to accept a probable new transaction, display the probable new transaction, if accepted, in the same manner as a first-group transaction, provide, if the probable new transaction is not accepted, an opportunity to select a matching transaction, and merge, if a matching transaction is selected, the selected matching transaction with the probable new transaction, recalculate the account balance based on the merger, and display the merged transaction in the same manner as a first-group transaction.

19. The system of claim 18 wherein the processor is further configured to:

receive additional data from the second source describing additional second-group transactions before each second-group transaction described by previously-received second source data has been accepted, merged or reclassified, classify the additional second-group transactions, recalculate the account balance based on the additional second-group transactions and display the recalculated account balance, and display in the graphical user interface, without a separate user instruction to do so and commingled with information about the first-group transactions, information about the additional second-group transactions.

20. The system of claim 19 wherein the processor is configured to periodically download second source data over a data communication network on a background program thread.

21. The system of claim 18 wherein the processor is further configured to:

categorize the first-group and the second-group transactions;

establish a budgetary limit for at least one transaction category;

calculate an effect upon the budgetary limit caused by second-group transactions that are within the at least one category, wherein the calculating an effect is performed without a separate user instruction to do so; and recalculate the effect upon the budgetary limit upon a user selecting an alternate transaction as a matching transaction, upon a user selecting a matching transaction for a probable new transaction, or upon a probable match transaction being classified as a probable new transaction.

* * * * *